Patented Apr. 21, 1925.

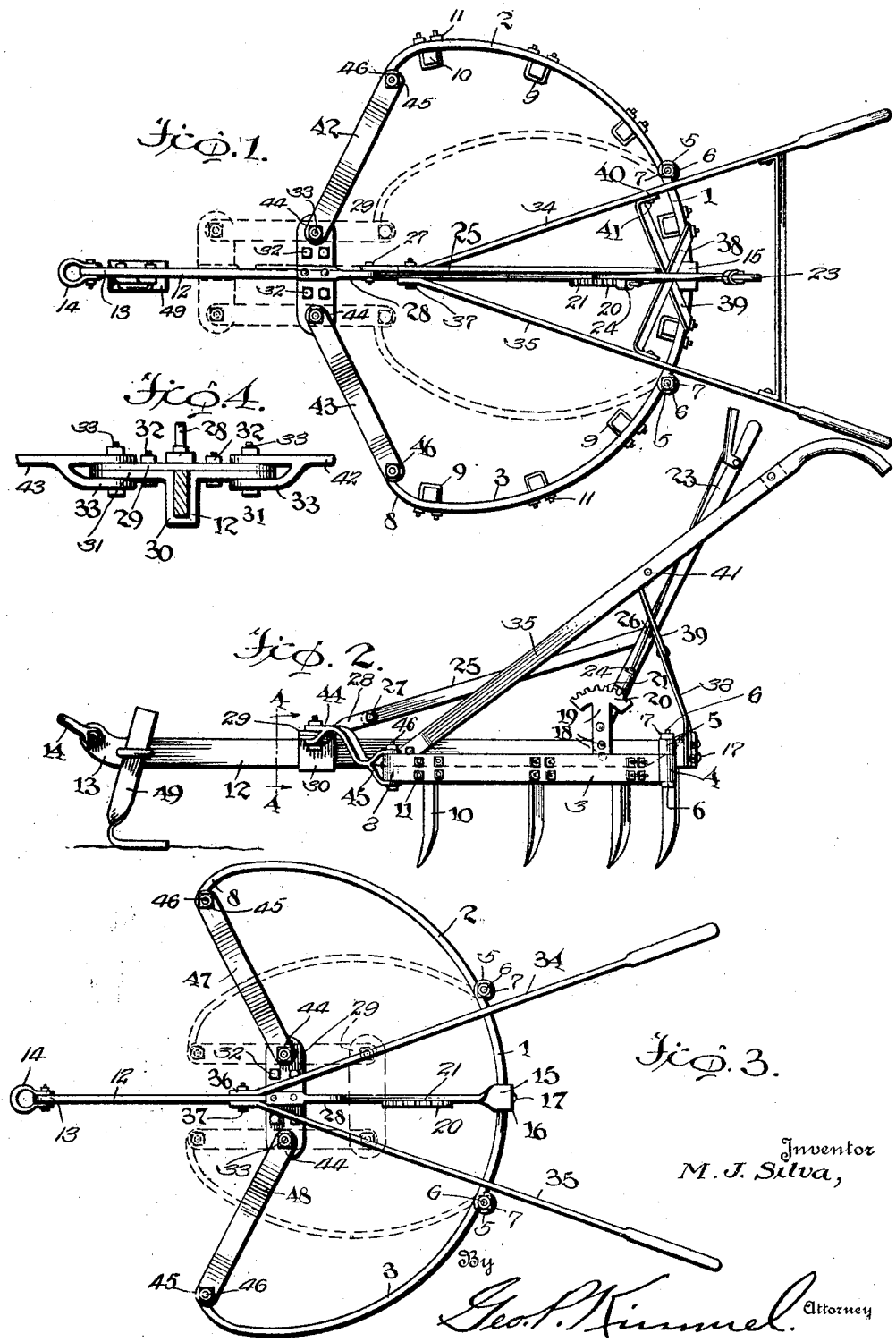

1,535,050

UNITED STATES PATENT OFFICE.

MANUEL J. SILVA, OF ISLAND OF HAWAII, TERRITORY OF HAWAII.

HARROW.

Application filed November 16, 1923. Serial No. 675,214.

*To all whom it may concern:*

Be it known that I, MANUEL J. SILVA, a citizen of the United States, residing on the island of Hawaii, county of Hawaii, Territory of Hawaii, have invented certain new and useful Improvements in Harrows, of which the following is a specification.

This invention relates to harrows and has for its object to provide, in a manner as hereinafter set forth, a ground working machine of such class, having an expansible and contractible body portion provided with harrow teeth and further including means coacting with the body portion for the purpose of increasing or decreasing the width of the track of the harrow to provide for the satisfactory working of the machine between rows of different widths.

Further objects of the invention are to provide a harrow, in a manner as hereinafter set forth, which is simple in its construction and arrangement, adjustable, strong, durable, compact, thoroughly efficient and convenient in its use, readily assembled, and comparatively inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a top plan view of a harrow in accordance with this invention, showing the body portion extended on full lines, and contracted in dotted lines.

Figure 2 is a side elevation thereof.

Figure 3 is a top plan view of a modified form.

Figure 4 is a section on line 4—4, Figure 2.

The construction of the form shown in Figure 1, is the same as that shown in Figure 3, with the exception of the manner of positioning the curved links for expanding and contracting the body portion, and the description of the construction of the form shown in Figure 1, with the exception of the curved links is to apply to the showing of the harrow by Figure 3.

In Figures 1 and 3, as well as in Figure 2, the body portion of the harrow is set up of an arcuate intermediate bar 1 and a pair of substantially semi-elliptical outer bars 2, 3. The bars forming the body portion are of the same width, but the bar 1 is arranged above the bars 2 and 3. The rear end of each of the bars 2 is provided with a barrel 4, and each end of the bar 1 is provided with a barrel 5 of less height than the height of the barrels 4, and the said barrels 5 are mounted upon the barrels 4.

Extending through each barrel 4 and the barrel 5 mounted thereon, is a headed bolt 6, carrying on its upper end a securing nut 7, and by this construction the bars 2, 3, are pivotally connected to the ends of the bar 1. The bars 2, 3, project forwardly from the bar 1 and have their forward ends inturned in a curvilinear manner, as at 8.

Each of the bars 1, 2 and 3, has projecting from its inner face a plurality of retaining yokes 9 which are employed for coupling to each bar a plurality of harrow teeth 10. The hold-fast devices 11 are employed for fixedly securing the retaining yokes 9 to the bars 1, 2 and 3.

The beam of the harrow as indicated at 12, is of substantial length so as to project forwardly from the body portion, and at its forward end is up-turned, as at 13 and carries a clevis 14. The rear end terminal portion of beam 12 is torsionally twisted, as at 15, and further bent downwardly as at 16, and fixedly secured to the outer face of the bar 1 by the hold-fast device 17.

Secured to one side of the beam 12, in proximity to the end terminal portion 15, by the hold-fast devices 18, is a vertically disposed support 19, provided at its top with an arcuate bar 20, having its top edge toothed, as at 21, to provide a rack. Pivotally connected to the support 19, as at 22, is an up-standing adjusting lever 23, carrying a spring controlled locking dog and releasing means therefor, of known construction, and which is referred to generally by the reference character 24.

Projecting forwardly from the lever 23, is a substantially elongated shifting bar 25, which has its rear end pivoted, as at 26, to the lever 23, at a point between the center and the lower end of said lever 23, and the said bar 25 has its forward end pivotally connected, as at 27, to an upwardly inclined arm 28, which is connected to or formed integral with a rectangular plate 29, mounted upon and projecting at each side from the beam 12.

Positioned at the sides and at the bottom edge of the beam 12, is a U-shaped coupling member 30, having each of its arms provided at its upper end with a right angularly disposed extension 31. The plate 29 is mounted upon the extensions 31, as well as being connected therewith by the hold-fast devices 32, 33. The arm 28, plate 29 and member 30 constitute a shifting element for the links which are employed for expanding and contracting the body portion, and the said shifting element is adjusted through the medium of the bar 25 when the latter is moved forwardly and rearwardly on the operation of the lever 23.

Both forms of the harrow, as shown, include a pair of upwardly disposed and outwardly inclined handle bars which project rearwardly from the body portion, that is to say, with respect to the intermediate bar 1 of the body portion, and said handle bars extend in opposite directions with respect to each other. In Figure 1, the handle bars are connected with the beam 12, rearwardly of the shifting element referred to, and in Figure 3, the handle bars are connected forwardly of the shifting element referred to. The handle bars are indicated at 34, 35 and the forward terminal of each thereof is bent to extend at an angle with respect to the remaining portion of the bar, as indicated at 36, and the said forward terminal 36 is positioned against one side of the beam 12. The setting up of the forward terminals 36 in the manner stated, provides for said forward terminals to be positioned in parallelism with respect to the beam. The forward terminals 36 are fixedly secured to the beam 12 by the hold-fast devices 37. Secured to the outer face of the intermediate bar 1 and extending upwardly therefrom, at an inclination, is a pair of brace members 38, 39, which are disposed in opposite directions with respect to each other and cross each other at a point intermediate their ends. The lower ends of the brace members 38, 39, are fixedly secured to the bar 1 by certain of the hold-fast devices 11, and the upper ends of the brace members 38, 39 are flanged, as at 40 and fixedly secured to the handle bars by the hold-fast devices 41.

In Figure 1 of the drawings, the links which are employed for expanding and contracting the body portion, are indicated at 42, 43, each of which is provided with a fork at each end, and the said forks are indicated at 44, 45. The fork 44 of each link straddles one end of the shifting element and is pivotally connected therewith by a hold-fast device 33. The fork 45 straddles the terminus of the inturned portion 8 of an outer bar of the body portion and is pivotally connected therewith, as at 46. The links 42, 43, extend forwardly from the bars 2, 3 and towards the shifting element at an inclination.

The links for expanding and contracting the body portion, in the form shown in Figure 3, are indicated at 47, 48, and are constructed in a similar manner as the links 42, 43, but the links 47 and 48 extend rearwardly from the free terminus of the inturned portions 8 of the outer bars 2 of the body portion and towards the shifting element. The links 47 are disposed at a rearward inclination, whereas, the links 42, 43 are disposed at a forward inclination. The difference between the form shown in Figure 1 and that shown in Figure 3 is that in Figure 1 the links 42, 43, project forwardly from the body portion, whereas, in Figure 3 the links 47 and 48 extend rearwardly with respect to the body portion The other difference between the form shown in Figures 1 and 3, resides in the manner of setting up the forward ends of the handle bars with respect to the beams and which has been hereinbefore referred to.

With respect to Figure 1, if it be desired to contract the body portion, the lever 23 is shifted forwardly which carries the bar 25 therewith, and the shifting element is moved to the position shown in dotted lines, Figure 1, and as the latter carries the links 42, 43 therewith, the links will assume the position shown in Figure 1 in dotted lines, and the bars 2, 3, will be moved to the position shown in dotted lines, Figure 1. The lever 23 is then locked and the body portion of the frame will be retained in a contracted position.

With respect to the form shown in Figure 3, if it be desired to contract the body portion, the lever 23 is shifted rearwardly, carrying the bar 25 therewith, which will move the shifting element rearwardly on the beam 12, so that the shifting element, links 47, 48 and bars 2 and 3 will assume the position shown in dotted lines. The lever is then locked and the body portion maintained in a contracted position.

The body portion in the form shown in Figure 1, or that shown in Figure 2, can be adjusted to various widths, as is obvious, depending upon the number of teeth comprising the rack 21, and the adjustment shown in dotted lines, is the maximum contraction of the body portion.

The beam 12, in proximity to the curved end terminal 13 thereof has a gauge shoe 49 carried thereby.

Although the preferred embodiment of the invention is as illustrated and described, yet it is to be understood that changes in the details of construction can be had which will fall within the light of the invention as claimed.

What I claim is:—

1. A harrow comprising a body portion formed of an intermediate arcuate bar and a pair of substantially semi-elliptical outer bars, means for pivotally connecting the rear ends of the outer bars to the ends of the intermediate bar, a beam projecting forwardly of the outer bars and having its rear end connected to the intermediate bar, a shifting element slidably mounted on said beam, oppositely disposed links connecting the forward termini of the outer bars to said element, means supported from the beam and pivotally connected to said element for shifting it, thereby providing for the contraction and expansion of said body, and teeth depending from said bars.

2. A harrow comprising a body portion formed of an intermediate arcuate bar and a pair of substantially semi-elliptical outer bars, means for pivotally connecting the rear ends of the outer bars to the ends of the intermediate bar, a beam projecting forwardly of the outer bars and having its rear end connected to the intermediate bar, a shifting element slidably mounted on said beam, oppositely disposed links connecting the forward termini of the outer bars to said element, means supported from the beam and pivotally connected to said element for shifting it, thereby providing for the contraction and expansion of said body, teeth depending from said bars, each of said links being curvilinear in the direction of their length and provided at each end with a fork, the forks at one end of the links overlapping said element, and the forks at the other end of the links overlapping the forward termini of said outer bars.

3. A harrow comprising a curvilinear body portion formed of an intermediate and a pair of outer bars, said outer bars arranged below said intermediate bar, means for pivotally connecting the rear ends of the outer bars to the ends of the intermediate bar, teeth carried by said bars, a beam projecting forwardly from said outer bars and having its rear end overlapping and fixedly secured to said intermediate bar, a shifting element slidably mounted on said beam, oppositely disposed links pivotally connected to the forward termini of the outer bars and pivotally connected to said element and providing means for contracting and expanding said body portion when said element is shifted, and actuating means for said element, said means supported from said beam and pivotally connected with said element.

4. A harrow comprising a curvilinear body portion formed of an intermediate and a pair of outer bars, said outer bars arranged below said intermediate bar, means for pivotally connecting the rear ends of the outer bars to the ends of the intermediate bar, teeth carried by said bars, a beam projecting forwardly from said outer bars and having its rear end overlapping and fixedly secured to said intermediate bar, a shifting element slidably mounted on said beam, oppositely disposed links pivotally connected to the forward termini of the outer bars and pivotally connected to said element and providing means for contracting and expanding said body portion when said element is shifted, and actuating means for said element, said means supported from said beam and pivotally connected with said element, each of said links curved in the direction of its length and provided at each end with a fork, the forks at one end of said links overlapping said element and the forks at the other end of said links overlapping the forward termini of said outer bars.

In testimony whereof, I affix my signature hereto.

MANUEL J. SILVA.